United States Patent [19]

Greenwald

[11] 3,873,819

[45] Mar. 25, 1975

[54] APPARATUS AND METHOD FOR FAULT-CONDITION SIGNAL PROCESSING

[75] Inventor: Donald James Greenwald, Phoenix, Ariz.

[73] Assignee: Honeywell Information Systems Inc., Waltham, Mass.

[22] Filed: Dec. 10, 1973

[21] Appl. No.: 423,649

[52] U.S. Cl. .......... 235/153 AK
[51] Int. Cl. .......... G06f 11/04
[58] Field of Search .......... 235/153 AK, 153 AE; 340/146.1 BE, 172.5

[56] References Cited

UNITED STATES PATENTS

| | | | |
|---|---|---|---|
| 3,519,808 | 7/1970 | Lawder | 235/153 AK |
| 3,609,704 | 9/1971 | Schurter | 235/153 AK |
| 3,692,989 | 9/1972 | Kandiew | 235/153 AK |
| 3,787,816 | 1/1974 | Hauch et al. | 235/153 AK |

*Primary Examiner*—Charles E. Atkinson
*Attorney, Agent, or Firm*—Ronald T. Reiling; Nicholas Prasinos

[57] ABSTRACT

Apparatus and method for collecting and processing signals derived from error checking equipment of a data processing unit. Upon identification of a fault condition by error checking equipment associated with each of several regions of the data processing unit, a group of signals is delivered to a selection network for transfer to a storage register. When a plurality of signal groups are delivered to the selection network simultaneously, the signal group to be transferred by the selection network to the storage register is determined by preselected priorities. The preselected priorities also determine when a later occuring signal group can replace a signal group in the storage register. The contents of the storage register indicates the occurrence of an error condition in each region of the data processing unit as well as detailed information concerning the error condition occurring in the highest priority region.

The apparatus has further provision for use in conjunction with test and diagnostic routines. A response to the detection of an error condition can be suppressed in order to test specific portions of the data processing unit.

25 Claims, 9 Drawing Figures

| UNIT | | MESSAGE TYPE | | PRIMARY ERROR INDICATORS | | | | | | | | | PRIMARY MASK FIELD | | | | | | |
|---|---|---|---|---|---|---|---|---|---|---|---|---|---|---|---|---|---|---|---|
| 00=CPU | | 00= INTEGRITY | | $\overline{CPU}$ | | CPU | | | | | | | CPU | | | | | | |
| 01=IOC | | 01= DIAGNOSTIC | | | | ZONE 1 | ZONE 2 | | | ZONE 3 | | ZONE 4 | ZONE 1 | ZONE 2 | | | ZONE 3 | | ZONE 4 |
| 10=MMS | | 10= RE-DETECT | | P-A | P-B | P1 | P2 | P3 | P4 | P5 | P6 | P7 | M1 | M2 | M3 | M4 | M5 | M6 | M7 |
| 11=MIU | | 11= ABORT | | MMS | MIU | CIA | ACU1 | ACU2 DMU | IFU | ALU1 | ALU2 | ALU3 LSU | CIA | ACU1 | ACU2 DMU | IFU | ALU1 | ALU2 | ALU3 LSU |
| 0 | 1 | 2 | 3 | 4 | 5 | 6 | 7 | 8 | 9 | 10 | 11 | 12 | 13 | 14 | 15 | 16 | 17 | 18 | 19 |

| PRIMARY PRIORITY FIELD | | | | | | MSR NO. | | CONTROL FIELD | | | |
|---|---|---|---|---|---|---|---|---|---|---|---|
| INTER-ZONE | | ZONE 2 | | ZONE 3 | | 00= MODULE 0 | | IN | | | OUT |
| 00= Z1,Z2,Z3,Z4 | | 00= P2,P3,P4 | | 00= P5,P6 | | 01= MODULE 1 | | SWITCH 1 | SWITCH 2 | SWITCH 3 | ATTENT. |
| 01= Z2,Z3,Z4,Z1 | | 01= P3,P4,P2 | | 01= P6,P5 | | 10= MODULE 2 | | | | | |
| 10= Z3,Z4,Z1,Z2 | | 10= P4,P2, | | 10= P5,P6 | | 11= MODULE 3 | | | | | |
| 11= Z4,Z1,Z2,Z3 | | 11= P4,P2,P3 | | 11 P6,P5 | | | | | | | |
| 20 | 21 | 22 | 23 | 24 | 25 | 26 | 27 | 28 | 29 | 30 | 31 |

CPU INTEGRITY CHECK COLLECTION (RC-U)

Fig. 6A.

| UNIT | | MESSAGE TYPE | | PRIMARY ERROR INDICATORS | | | | | | | | PRIMARY MASK FIELD | | | | |
|---|---|---|---|---|---|---|---|---|---|---|---|---|---|---|---|---|
| 00=CPU | | 00= INTEGRITY | | $\overline{IOC}$ | | IOC | | | | | | IOC | | | | |
| 01=IOC | | 01= DIAGNOSTIC | | | | ZONE 1 | | | | | ZONES 2&3 | ZONE 1 | | | | |
| 10=MMS | | 10= RE-DETECT | | P-A | P-B | P1 | P2 | P3 | P4 | P5 | P6 | M1 | M2 | M3 | M4 | M5 |
| 11=MIU | | 11= ABORT | | MMS | MIU | SCU1 | SCU2 | MMU1 | MMU2 | MMU3 | CCU | SCU1 | SCU2 | MMU1 | MMU2 | MMU3 |
| 0 | 1 | 2 | 3 | 4 | 5 | 6 | 7 | 8 | 9 | 10 | 11 | 12 | 13 | 14 | 15 | 16 |

| PRIMARY PRIORITY FIELD | | | | | CHANNEL CONTROL NO. | | | | MSR NO. | | CONTROL FIELD | | | |
|---|---|---|---|---|---|---|---|---|---|---|---|---|---|---|
| SCU/MMU | SCU | | MMU | | 0000 = CCU NO. 0 | | | | 00= MODULE 0 | | IN | | | OUT |
| 0= SCU/MMU | 00= P1, P2 | | 00= P3,P4,P5 | | • | | | | 01= MODULE 1 | | SWITCH 1 | SWITCH 2 | SWITCH 3 | ATTENT. |
| | 01= P2,P1 | | 01= P4,P5,P3 | | • | | | | 10= MODULE 2 | | | | | |
| 1= MMU/SCU | 10= P1,P2 | | 10= P5,P3,P4 | | • | | | | 11= MODULE 3 | | | | | |
| | 11= P2,P1 | | 11= P5,P3,P4 | | 1111 = CCU NO. 15 | | | | | | | | | |
| 17 | 18 | 19 | 20 | 21 | 22 | 23 | 24 | 25 | 26 | 27 | 28 | 29 | 30 | 31 |

IOC INTEGRITY CHECK COLLECTION (RI-U)

Fig. 6B.

APPARATUS AND METHOD FOR FAULT-CONDITION SIGNAL PROCESSING

BACKGROUND OF THE INVENTION

1. Field of the Invention

This invention relates generally to a data processing unit and more particularly to that portion of the data processing unit devoted to collecting and processing information related to detected error conditions in the data processing unit.

2. Description of the Prior Art

It is known in the prior art to provide test and verification equipment associated with data transfers and with data manipulations in the data processing unit. For example, parity checking equipment compares parity check signals, calculated from a set of data after an operation (e.g. such as a data transfer) with parity check signals calculated from the set of data before the operation. Upon detection of a difference between the two groups of parity check signals, a fault or error condition is established. This information must be communicated to the data processing unit to prevent further compromise of the integrity of the data set. Where possible, the operation will be repeated with the original set of data to determine if the detected fault condition is a spurious condition or if the detected fault condition is reproducible and thus caused by a malfunction of some portion of the data processing unit.

When repetition of the operation producing the detected fault condition is not possible, or where the fault condition recurs, the nature and location of the detected error must be visible to the data processing unit and/or to an operator for response appropriate to the fault condition. It is known in the prior art to provide a plurality of registers associated with each unit of the test and verification equipment for storing information concerning a detected fault condition, the particular register storing the fault condition information providing the location of the apparatus detecting the fault condition. The contents of the storage register thus localizes the portion of data processing unit producing the fault condition. The storage register, or the test and verification equipment also signals that a compromise in the integrity of the data processing unit has occurred. However, in a large data processing unit, the number of storage registers is prohibitively large. Furthermore, the retrieval of the information must either be accomplished manually (i.e. by an operator) or a large number of (nonfunctional) data paths must be provided.

To minimize the number of storage registers needed for the test and verification equipment, the information concerning the fault condition can be transferred to a central storage register along with a code describing the location of the observed error. However, a fault condition may propagate through several portions of that data processing unit before detection occurs. Thus, a single fault condition can be detected at several points in system. In the prior art, information relating to the first-occurring detection of the fault condition is delivered to the central storage register. It is desirable, however, to be able to select the information to be placed in the central storage register while retaining information of the occurrence of other detected fault conditions.

The trend of the modern data processing unit is toward more autonomy in the operation of the Input/Output Controller (IOC) viz-a-viz the Central Processing Unit (CPU). This trend serves to divide the apparatus of the data processing unit naturally into two portions i.e. that apparatus connected with the functions of the CPU and that apparatus associated with the functions of the IOC. It is desirable to separate detected fault conditions on the basis of these two divisions.

Many fault conditions occur in the Memory Interface Unit (MIU) or in the Main Memory Subsystem (MMS), removed from a central storage register located in either the CPU or the IOC. It is desirable to provide a method of delivering information concerning fault conditions in the MIU or MMS to these central storage registers without providing additional data paths.

The apparatus for detection and collection of fault condition information is necessary in the test and diagnostic procedures for the identification and location of the portion of the apparatus producing the fault condition. However, it is frequently necessary to suppress the presence of a fault condition, for example, when data is containing erroneous parity check signals purposely placed into the data processing unit to verify the operation of the detection apparatus. Because of the propogation of data through the system, it is frequently desirable, in test and diagnostic procedures, to ignore error signals from one portion of the apparatus and to concentrate on error signals in a different portion of the apparatus. Further, error signals may appear simultaneously at several error detection points in the data processing unit, and it may be important to assign priorities to simultaneouosly occurring error signals.

It is therefore an object of the present invention to provide an improved data processing unit.

It is another object of the present invention to provide apparatus in a data processing unit for collecting and processing data provided by fault detection equipment.

It is a further object of the present invention to collect data concerning fault conditions along with information describing the region of the data processing unit in which the fault condition occurred.

It is still a further object of the present invention to allow, in a storage register, fault condition data collected in a selected region to replace fault condition data collected in another region of the data processing unit.

It is a still further object of the present invention, where more than one fault condition is detected simultaneously, to give priority to fault condition signals to be placed in a storage register.

It is a more particular object of the present invention to provide apparatus for collecting and processing fault condition date associated with the date processing operations related to the IOC and to provide apparatus for collecting and processing fault condition data associated with data processing operations related to the CPU.

It is still another object of the present invention to provide for the use of pre-existing data paths to transfer fault condition data from selected regions of a data processing unit to a central storage register.

It is still a further object of the present invention to prevent the data processing unit from responding to error conditions detected in pre-determined portions of the data processing unit.

SUMMARY OF THE INVENTION

The aforementioned and other objects of the present invention are accomplished by a storage register, a selection network associated with the register, and apparatus for detection of fault conditions, the fault detection apparatus generating of error condition signals related to the fault conditions. The error condition signals are delivered to the selection circuits for transfer to the storage register.

When a plurality of groups of error condition signals are applied simultaneously to the selection circuits, the group of error condition signals, to be transferred to the storage register is determined by preselected priorities. The preselected priorities also cause a later occurring group of error condition signals to replace an error signal group of lower priority, in the storage register. The storage register also contains the information that an error signal group has been applied to the selection network from one of the regions in the data processing unit.

The presence of data establishing a detected fault condition in the registers is signalled to the control circuitry of the data processing unit for an appropriate response. Apparatus is also supplied so that selected signals to the control circuitry can be masked, preventing a response by the data processing unit to the presence of a detected error condition.

The storage register is divided into two sets of register cells. The first set of register cells contain data signals indicating the occurrence of a detected fault condition in any one of several portions of the data processing unit. The second set of register cells contains data signals establishing the nature of a detected fault condition for a selected portion of the data processing, or in the absence of a detected fault condition in the selected portion, the most recently detected fault condition.

According to another embodiment, a storage register, selection network and fault detection apparatus is associated with the Central Processing Unit, while a second storage register, a second selection network, and a second group fault detection apparatus is associated with the Input/Output Controller. The detected fault conditions are thus localized with respect to the CPU and IOC by the presence of a group of fault condition signals in the appropriate storage register.

These and other features of the invention will be understood upon reading of the following description along with the drawings.

BRIEF DESCRIPTION OF THE DRAWINGS

FIG. 6A shows the definitions of the first 32 cell bit positions of Register RC associated with the Central Processing Unit.

FIG. 6B shows the definition of the first 32 cell positions of the Register RI associated with the Input/Output Controller.

DESCRIPTION OF THE PREFERRED EMBODIMENT

Detailed Description of the Figures

Figure 1:
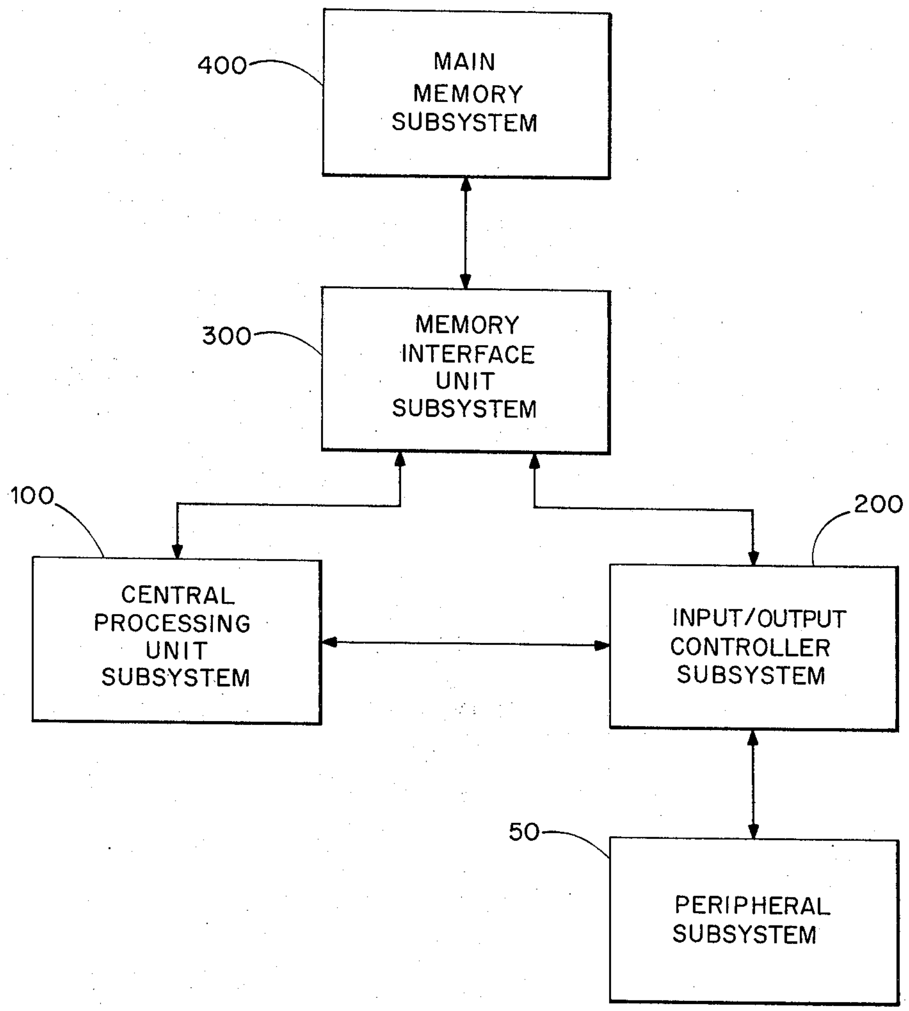
FIG. 1 is a block diagram of the principal subsystems of a data processing unit.

Referring now to FIG. 1, a block diagram of the principal subsystems of a data processing unit is shown. Peripheral Subsystem 50 consists of peripheral units (such as printers, magnetic tape units, etc.) which supply data to or receive data from the remainder of the data processing unit. The Input/Output Controller Subsystem (IOC) 200 controls the transfer of data from the peripheral units of Peripheral Subsystem 50 to the data processing unit. The Main Memory Subsystem (MMS) 400 provides the apparatus for storage of data currently required for the operation of the data processing unit. The Central Processing Unit Subsystem (CPU) 100 contains the apparatus for implementing the major portion of the control and manipulative functions of the data processing unit. The Memory Interface Unit Subsystem (MIU) 300 provides the apparatus for controlling the transfer of data between the MMS 400 and the CPU 100 or IOC 200.

Figure 2:
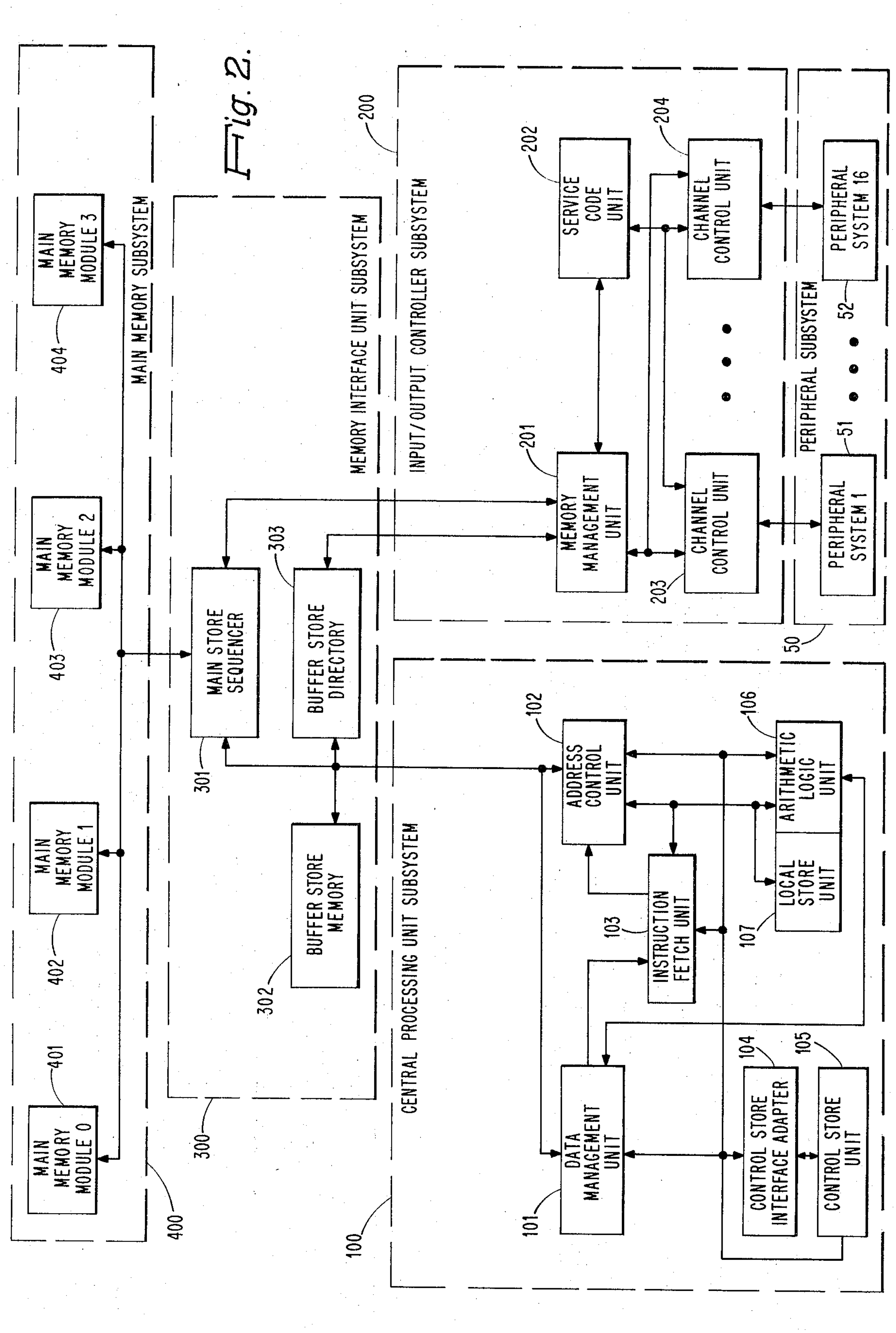
FIG. 2 is a block diagram of major components of the principal subsystems of a data processing unit.

Referring next to FIG. 2, important component units of the subsystems of the data processing unit are shown. The coupling, shown in FIG. 2, between the various component units of the subsystems are representative and not comprehensive as will be apparent to one skilled in the art. The component units of the Peripheral Subsystem 50, however, are not included because they do not form a part of the present invention. The IOC 200 is comprised of a Memory Management Unit 201, a Service Code Unit 202, and a series of Channel Control Units of which two, Channel Control Unit 203 and Channel Control Unit 204, are shown. In the preferred embodiment, any number of Channel Control Units up to 16, can be present. Each Channel Control Unit provides an interface between component peripheral units of the Peripheral Subsystem 50 and the Memory Management Unit 201 and the Service Code Unit 202. The Channel Control Units buffer data to and from component peripheral units of the Peripheral Subsystem 50 and store information concerning the status of the associated peripheral channels.

The Main Memory Subsystem 400 comprises at least one Main Memory Module. In the preferred embodiment, four Main Memory Modules (401, 402, 403 and 404) are present. These Main Memory Modules may be operated in various modes, such as an interleaved mode. The Main Memory Modules provide the apparatus for storage of the data necessary for the execution of the current processing tasks of the data processing unit.

The CPU 100 is comprised of a Data Management Unit 101, an Instruction Fetch Unit 103, an Address Control Unit 102, a Local Store Unit 107, an Arithmetic Logic Unit 106, a Control Store Interface Adapter 104, and a Control Store Unit 105. The operations of the CPU are controlled by instructions in the Control Storage Unit 105. The instructions in the Control Store Unit 105, are loaded, in the preferred embodiment, by a control store load unit external to the CPU 100. The Control Store Interface Adapter 104 contains the logic necessary for directing the Control Store Unit 105, such as address modification, address generation testing, etc. The Arithmetic Logic Unit 106 is comprised of the apparatus for performing the primary arithmetic operations and data manipulations required of the CPU. The Local Store Unit 107 is comprised of a small memory and associated logic apparatus and is used to store CPU control information as well as for temporary storage of operands and partial results during the data manipulation. The Address Control Unit 102 includes apparatus for address development in the CPU. The Instruction Fetch Unit 103 contains apparatus for keeping the Control Store Unit 105 of the CPU supplied with instructions and, in addition, attempts to have the next instruction available before completion of the present instruction. The Data Management Unit 101 provides an interface between CPU and the Buffer Store Directory 303 and/or the Buffer Store Memory 302. The apparatus of the Data Management Unit 101 determines which portion of the memory of the data processing unit contains the information to be retrieved and transfers the information into the CPU at the proper time.

The Memory Interface Unit Subsystem 300 is comprised of a Buffer Store Memory 302, a Buffer Store Directory 303 and a Main Store Sequencer 301. The Buffer Store Memory 302 provides a small memory storage area for data to be used next by the CPU or that will receive a high percentage of usage in the CPU during a given time. The Buffer Store Directory 303 contains apparatus for establishing if a given portion of data is contained in the Buffer Store Memory 202. The Main Store Sequencer 301 provides apparatus for an interface between the modules of the Main Memory Subsystem and the IOC 200, or CPU 100.

Figure 3:
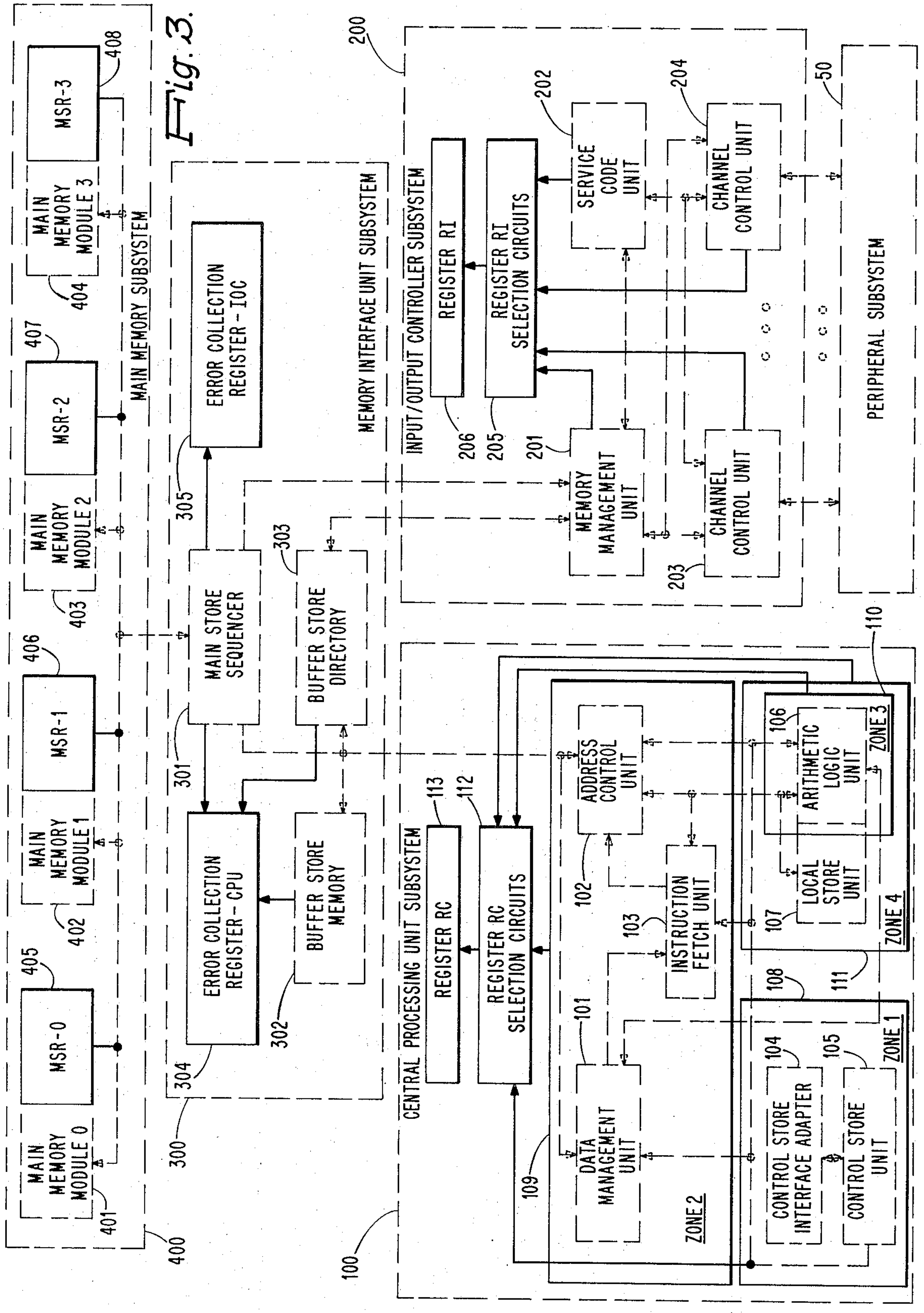
FIG. 3 is a block diagram of the apparatus fault collection of fault condition data added to the data processing unit according to the present invention.

Referring next to FIG. 3, apparatus which is associated with the component units of the data processing unit subsystems and used for the collection and processing of error signals generated upon the detection of an error condition is shown. In the Main Memory Subsystem 400, Maintenance Status Registers (MSR) 405, 406, 407 and 408 are associated with Main Memory Modules 401, 402, 403 and 404, respectively. The MSR's provide temporary storage registers (along with associated apparatus) for storing data indicating the occurrence and location of an error in the associated memory module.

In the MIU 300, an Error Collection Register — CPU 304, and an Error Collection Register — IOC 305, collect data indicating the occurrence and location of an error in that portion of the MIU associated with data transfer from the MMS 400 involving the CPU or the IOC respectively. Thus, Error Collection Register — IOC 305 is coupled to a portion of the Main Store Sequencer 301 and associated apparatus involving the IOC while the Error Collection Register — CPU 304 is coupled to a portion of the Main Store Sequencer 301 and associated apparatus involving the CPU as well as the Buffer Store Memory 302 and the Buffer Store Directory 303.

In the IOC 200, a Register RI 206 provides a storage facility of error information generated in the IOC. Associated with Register RI 206 is Register RI Selection Circuit 205 which is also coupled to the component units of the IOC i.e. Memory Management Unit 201, Service Code Unit 202 and Channel Control Unit 203 through Channel Control Unit 204. The Register RI Selection Circuit 205 selects the data to be placed in Register RI 206, in the presence of conflicting error signals.

In the CPU 100, the error data collection apparatus includes Register RC 113 and Register RC Selection Circuit 112. Register RC Selection Circuit 112 is coupled to a first portion of the CPU component units labeled Zone 1 which includes the Control Store Interface Adapter 104, and the Control Store Unit 105; a second portion of the CPU component units labelled Zone 2 which includes the Data Management Unit 101, the Address Control Unit 102 and the Instruction Fetch Unit 103; a third portion of the CPU component units labelled Zone 3 which includes the Arithmetic Logic Unit 106; and a fourth portion of the CPU component units labelled Zone 4 which includes the Local Store Unit 107 and the Arithmetic Logic Unit 106. When the Arithmetic Logic Unit 106 operates in a "word" mode (a word contains a plurality of data bytes), the ALU 106 is part of Zone 3. When the Arithmetic Logic Unit 106 operates in a "byte" mode, the ALU 106 is part of Zone 4.

Register RC and Register RI are coupled directly to all detection apparatus via non-functional (non-functional in the sense that they do not contribute to the processing of data) paths not shown in FIG. 3. The presence of an error condition in the data processing unit is signalled to the appropriate register via these non-functional paths.

Figure 4:
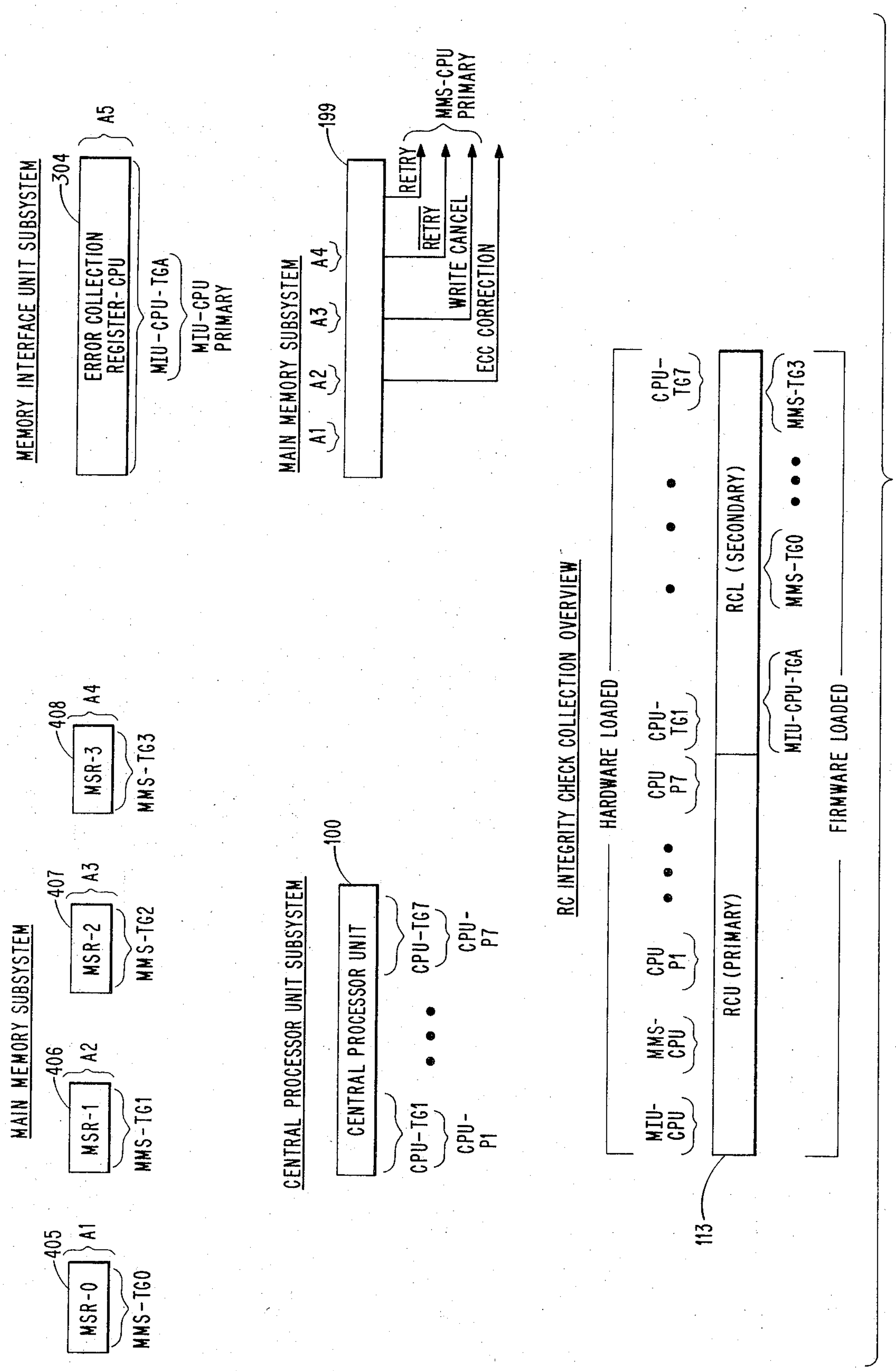
FIG. 4 shows a summary of the collection of fault condition data associated with the Central Processing Unit according to the present invention.

Refer now to FIG. 4. A summary of the collection of the fault condition data for storage in Register RC 113, according to the preferred embodiment, is shown. Register RC is divided into two groups of register cells, Register RCU and Register RCL. Register RCU contains, in general, primary signals indicating the occurrence of an error (or errors) in a particular portion of the CPU, MIU or MMS, while the RCL portion of Register RC contains secondary signals identifying the errors indicated by appropriate cell contents in the RCU portion of Register RC.

In the Main Memory Subsystem, the four modules produce primary signals A1 through A4 upon detection of a certain types of error conditions in the associated Memory Modules, and secondary signals MMS–TG0 through MMS–TG3 establishing the identification of the detected fault condition indicated by signals A1 through A4.

In the Memory Interface Unit, a secondary signal MIU-CPU-TGA identifies a detected error and is stored in Error Collection Register-CPU, 304. From this secondary signal, a primary signal MIU–CPU is generated which determines the portion of the apparatus associated with the CPU in which the error occurs. Signals A1 through A4 are compared in Circuit 199 to determine if the error is of a nature that a primary signal MMS–CPU must be delivered to the Register RC. A Retry signal (indicating that a fault condition producing operation can be attempted a second time), a $\overline{\text{Retry}}$ signal (indicating that a fault condition producing operation cannot be attempted a second time) or a Write Cancel signal (indicating that introduction of data into the MMS has been cancelled because of a detected fault condition) cause an MMS–CPU Primary Error Signal to be generated. The correction of data by the Error Correcting Code apparatus, generating an ECC correction signal, however, does not cause an MMS–CPU Primary Error Signal to be generated.

In the Central Processing Unit 100, a total of seven sets of secondary signals CPU–TG1 through CPU–TG7 can be generated upon detection of an error. From these signals, seven primary signals CPU–P1 through CPU–P7 are generated. The appropriate primary signals are then placed in the appropriate RCU proportion of the Register RC 113, while appropriate secondary signals are placed in the RCL portion of the Register RC. Still referring to FIG. 4, primary signals can be entered in Register RC by a hardware mechanism while secondary signals can be entered in Register RC either by a hardware-controlled or a firmware-controlled operation. In the preferred embodiment, the primary signals and the CPU–TG1 through TG7 secondary signals are placed in Register RC 113 through hardware-controlled operations via non-functional data paths. The secondary signals on Error Collection Register-CPU 304 (MIU–CPA–TGA) and the secondary signals from the MSR's (MMS–TG0 through MMS–TG3) are applied to Register RC 113 by firmware-controlled operation via functional paths.

Figure 5:
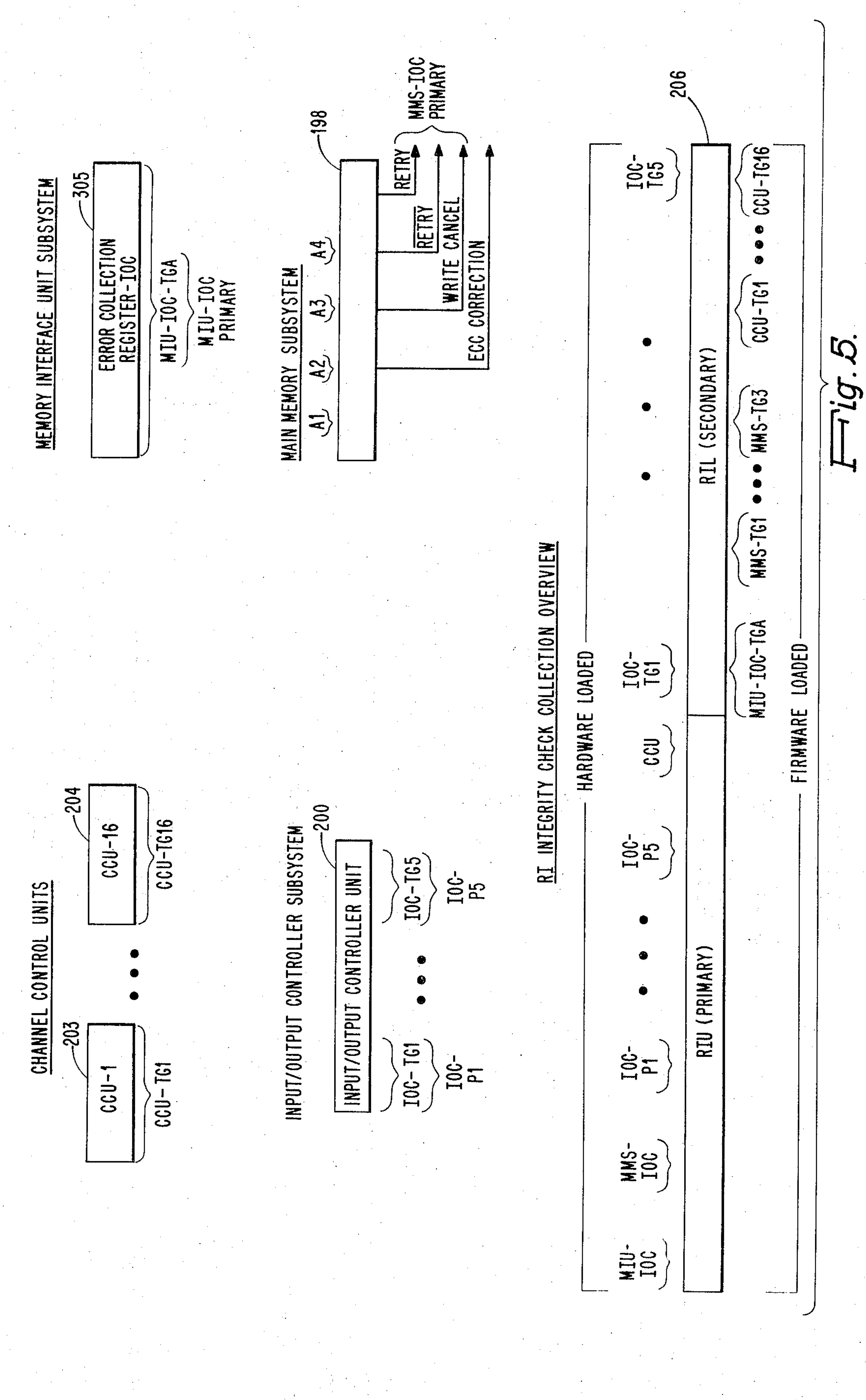
FIG. 5 shows a summary of the collection of fault condition data associated with the Input/Output Controller according to the present invention.

Refer now to FIG. 5. An overview of the collection of the integrity data related to the Input/Output Controller, Subsystem for entry into Register RI 206, is shown. The cells of Register RI are divided into groups forming a Register RIU for storing primary integrity signals and a Register RIL for storing secondary signals. The IOC 200 contains five regions, excluding the Channel Control Units. An error in one of the regions produces one of a set of secondary signals IOC–TG1 through IOC–TG5 identifying the error. From these secondary signals, a related group of primary signals IOC–P1 through IOC–P5 are entered into Register RIU through a hardware operation. The IOC–TG1 through IOC–TG5 secondary signal groups can be hardware-loaded into the Register RIL. An error in the Channel Control Units CCU–1 through CCU–16 produces one of a set of error signals CCU–TG1 through CCU–TG16, which can be loaded into the Register RIL, identifying the error in the Channel Control Units. A CCU signal, hardware-loaded into the Register RIU specifies the particular Channel Control Unit in which the error has been detected.

An error detected in the MIU Subsystem 300 causes secondary signals MIU–IOC–TGA, localizing the error placed into Error Collection Register-IOC 305. Subsequently, a primary signal MIU–IOC is generated and hardware loaded into the Register RIU while the secondary signals, MIU–IOC–TGA can be loaded by a firmware operation into the Register RIL.

The application of the error signals from the Main Memory Subsystem 400 to the Register RI is similar to the application of equivalent signals to the Register RC.

Refer next to FIG. 6A showing the interpretation of the bit positions of the RCU portion of the Register RC 113 and FIG. 6B showing the interpretation of bit positions of the RIU portion of Register RI 206 according to the preferred embodiment. However, other arrangements of register positions will be apparent to one skilled in the art. In both Register RC and Register RI, position 31 indicates the presence of error condition information in that particular register. Register positions 28, 29 and 30 indicate the status of certain external switches which are used, in the preferred embodiment, to control certain portions of the diagnostic procedure. Register positions 26 and 27 indicate in which Main Memory Module (of the four in the preferred embodiment) an error has been detected. Register positions 0 and 1 denotes which subsystem (CPU, IOC, MIU and MMS) has placed a message in the register. Register positions 2 and 3 indicate the status of the system prevailing at the time that a fault condition was detected, i.e. resulting in an integrity message, diagnostic message, re-detect message or an abort message.

Referring now only to FIG. 6A, register positions 4 and 5 indicate the origin of an error message (i.e. MMS or MIU) when it is not in the CPU 100. The Central Processing Unit has been divided into several zones to increase the usefulness of the Register. Register positions 6 through 12 indicate in which zone an error, detected in the CPU, has been found. In addition to the four Zones, Zone 2 is further sub-divided into 3 regions, while Zone 3 is further sub-divided into 2 regions. Register positions 13 through 19 indicate the presence of a mask field signal for any of the regions of the CPU. Bit positions 20 through 25 indicate the priority with which secondary signals are loaded into the RCL portion of Register RC.

Referring now to FIG. 6B dealing specifically with the IOC portion of the data processing unit, register positions 4 and 5 indicate from which sub-system (i.e. MIU or MMS) other than the IOC, an integrity message has been received. Register positions 6 through 10 indicate which portion of the Service Code Unit 202 or the Memory Management Unit 201 signaled the integrity message. The register position 11 indicates that the integrity message arose from one of the Channel Control Units and register positions 22 through 25 identify the particular Channel Control Unit in which the fault condition has been detected. Register positions 12 through 16 indicate the presence of a mask field signal for any of the regions of the IOC. Register positions 17 through 21 identify the priority of data in the RIL portion of Register RI 206.

Figure 7:
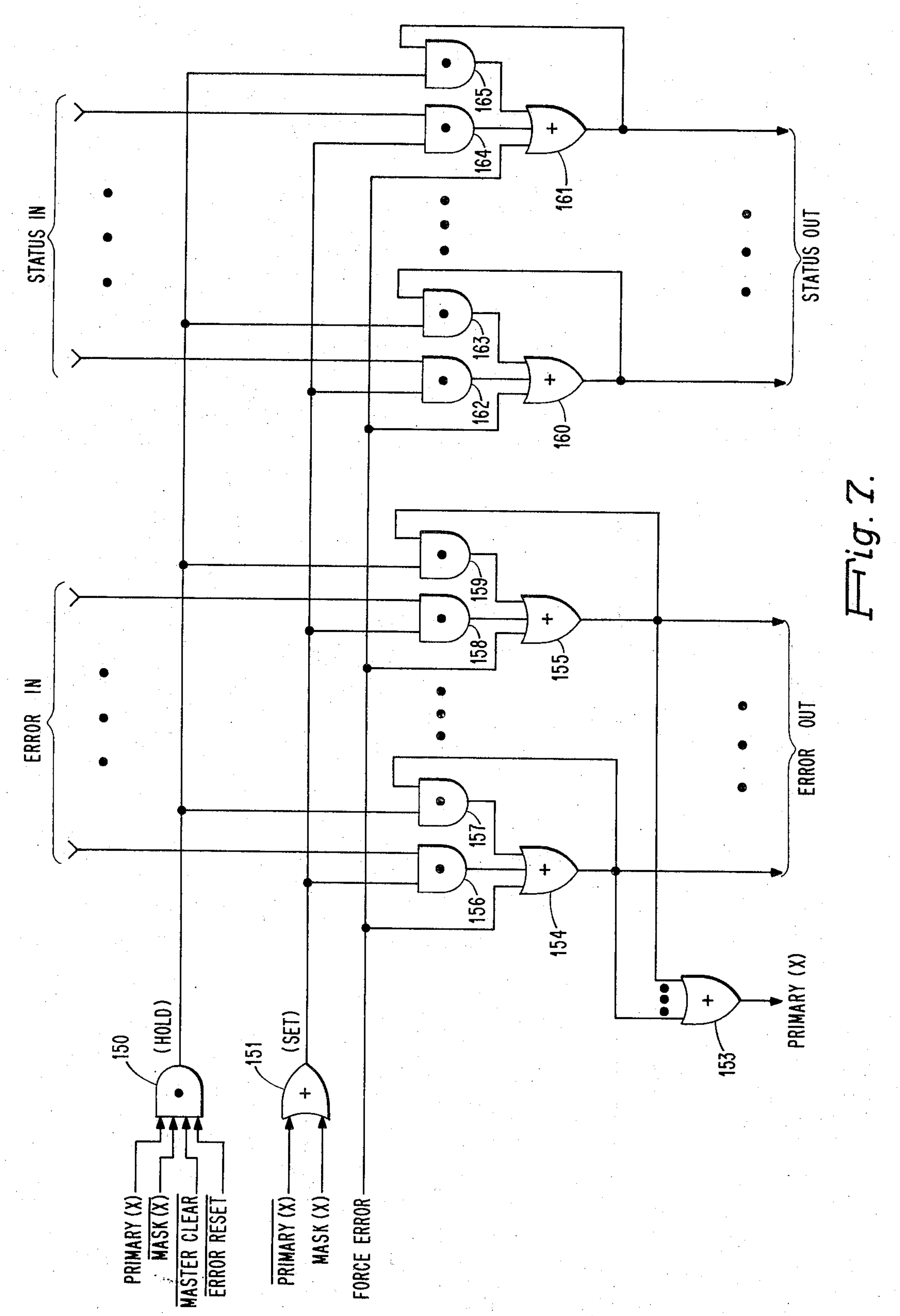
FIG. 7 shows the selection network associated with collection of a single group of fault condition signals for the Register RI or Register RC originating from a single region of the data processing unit.

Referring next to FIG. 7, the selection circuits associated with Register RC are shown for Zone 1 and Zone 4 (i.e. the Zones which are not further subdivided) of the CPU. Each of the cells of the register (of which four are shown) are comprised of a logic OR gate (154, 155, 160, or 161), an input signal logic AND gate (156, 518, 162, or 164) and a recirculation logic AND gate (157, 159, 163, or 165). The operation of one selection circuit unit consisting of the OR gate 154, AND gate 156 and AND gate 157 is as follows, the operation of the remaining selection circuit units being similar. OR gate 154 has the output signal of a Force Error circuit coupled to one input terminal, the output terminal of AND gate 156 coupled to a second input terminal and output terminal of AND gate 157 coupled to a third input terminal. One input terminal of AND gate 157 is coupled to an output terminal of OR gate 154. A second input terminal of gate 157 is coupled to a Hold signal. The Hold signal is provided by the output terminal of a logic AND gate 150. The input terminals of AND gate 150 are coupled to a Primary ($x$) signal, a $\overline{\text{Mask }(x)}$, a Master Clear signal and an Error Reset signal where $x$ indicates with which of the four zones the circuit is associated. AND gate 157 provides a recirculation path, so long as the input signals to AND gate 150 are logic ONE'S, thereby maintaining or latching the output signal of OR gate 154. One input terminal of OR gate 154 is coupled to an output terminal of AND gate 156. One input terminal of AND gate 156 is coupled to the incoming (Error In) error signals, while a second input terminal of AND gate 156 is coupled to a Set signal. The Set signal is produced by the output of logic OR gate 151. One input terminal of OR gate 151 is coupled to $\overline{\text{Primary }(x)}$, while a second input terminal of OR gate 151 is coupled to a Mask ($x$) signal. The output terminal of OR gate 154 is coupled to an input terminal of logic OR gate 153. The remainder of the output signals of the register cells with error signal inputs are coupled to input terminals of OR gate 153 and produce a Primary ($x$) signal. The Status In signals provide data other than that for identification of a detected fault condition. While the Status In signals can be present continuously, these signals are not coupled to OR gate 153 and therefore do not generate a primary signal.

Figure 8:
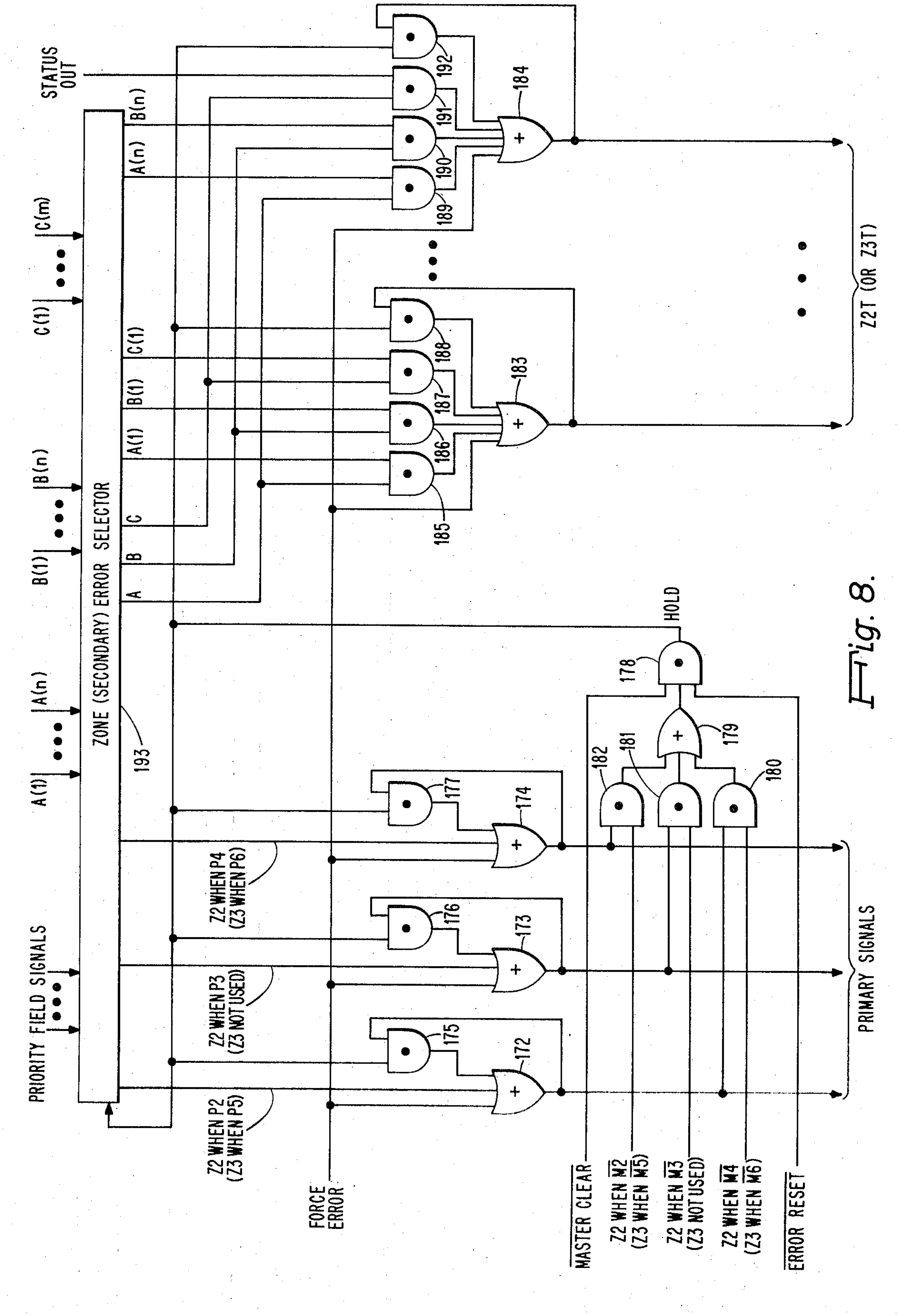
FIG. 8 shows the selection network associated with collection of multiple groups of fault condition signals for the Register RC or Register RI originating from a single region in the data processing unit.

Referring next to FIG. 8, the selection circuits for producing the signals from the plurality of regions of Zone 2 and Zone 3 is shown. Each Zone has a Zone Secondary Error Selector 193 circuit associated with it. The Zone Secondary Error Selector 193 circuit determines, on the basis of Priority Field Signals, which group of signals, A(1) – A(n), B(1) – B(n), or C(1) – C(m) will be applied to Register RC. The Zone Secondary Error Selector accomplishes this by activating an appropriate enabling signal A, B, or C. Further, the application of a positive signal to the Zone Error Selector in the signal groups A(1) – A(n), B(1) – B(n) and C(1) – C(m) causes a Primary Signal to appear at the appropriate output terminal of logic OR gates 172, 173 and 174. Signals A(1) – A(n), B(1) – B(n) and C(1) – C(m < n) are applied to Error Selector 193. (The apparatus allows for external signals designated as Status Out in FIG. 8 to be included with the secondary signal groups, but not to generate Primary Signals that would typically result from a non-zero signal group.) Considering Zone 2, containing region P2 (A(j) signals), region P3 (B(j) signals) and region P4 (C(j) signals), the presence of a detected error established by the signals causes a positive logic signal to be applied to input terminal of logic OR gate 172 in the case of P2 signals, a positive logic signal to be applied to an input terminal of logic OR gate 173 in the case of P3 signals and/or a positive logic signal to be applied on an input terminal of logic OR gate 174 in the case of region P4 signals. An output terminal of OR gate 172 is coupled to an input terminal of logic AND gate 175. A second input terminal of AND gate 175 is coupled to a HOLD signal, while an output terminal of AND gate 175 is coupled to an input terminal of OR gate 172. An output terminal of OR gate 173 is coupled to an input terminal of logic AND gate 176. A second input terminal of OR gate 173 is coupled to an output terminal of AND gate 176, while a second input terminal of AND gate 176 is coupled to the HOLD signal. An output terminal of OR gate 174 is coupled to an input terminal of logic AND gate 177. An output terminal of AND gate 177 is coupled to a second input terminal of OR gate 174, while a second input terminal of AND gate 177 is coupled to the HOLD signal. When the HOLD signal is a positive logic signal, logic AND gates 175, 176, 177 provide a recirculation path for OR gates 172, 173 and 174 respectively and maintain the output signals of this logic OR gates. A third input terminal of OR gates 172, 173 and 174 is coupled to a FORCE ERROR signal.

When the output terminal of OR gates 172, 173, or 174 is a positive logic signal, the register position of the RCU register for the display of information of the particular region and zone in which the error has a primary signal applied to its particular region.

Logic OR gate 183 along with logic AND gates 185, 186, 187 and 188 comprise a circuit for supplying a first secondary signal position derived from signals from the regions of Zone 2, while logic OR gate 184, and logic AND gates 189, 190, 191 and 192 comprise the last (or $n$-th) position of the secondary signal output for Zone 2. The output terminal of OR gate 183 which supplies the first secondary position signal, is coupled to one input of AND gate 188. An output terminal of AND gate 188 is coupled to an input terminal of OR gate 183. A second input terminal of AND gate 188 is coupled to a HOLD signal. The AND gate 188 provides a recirculation path for storing or maintaining the signal at the output terminal of OR gate 183 for as long as the HOLD signal is a positive logical signal. Another input terminal of OR gate 183 is coupled to a FORCE ERROR signal which provides a positive logic signal at the output of OR gate 183. Signals A(1), B(1) and C(1) from the respective regions of Zone 2 are applied to an input terminal of AND gate 185, AND gate 186, and AND gate 187 respectively, while output terminals from each of the AND gates 185, 186, 187 are coupled to input terminals of OR gate 183.

Signals A, B, and C are applied to second input terminals of AND gate 185, 186, and 187 respectively. Priority Field Signals applied to Selector 193 cause an activation of the Selector 193 circuits. The Selector 193 circuits determine, on the basis of the Priority Field Signals of the Register RC, FIG. 6A, which of the three secondary groups of signals from Zone 2 is to be stored at the output terminals of OR gate 183 through OR gate 184. A positive logic signal, applied to the appropriate A, B or C terminal, causes the storage of the selected signals at the output OR circuits.

Logic AND gate 191 is arranged to include an external signal, labelled in FIG. 8 Status Out, along with other signals of the selected tertiary groups. The number of Status Out signals to be included with a secondary signal group is a matter of design choice. The Status Out signals do not contribute to the identification of a detected error, but indicate states of the data processing unit as well as check circuits whose output does not indicate the presence of an error.

The HOLD signal appears at an output terminal of logic AND gate 178. A first input terminal of AND gate 178 is coupled to a $\overline{\text{Master Clear}}$ signal, while a second input terminal of AND gate 178 is coupled to an $\overline{\text{Error Reset}}$ signal. A third input terminal of AND gate 178 is coupled to an output terminal of logic OR gate 179. Output terminals of logic AND gate 180, logic AND gate 181 and logic AND gate 182 are coupled to input terminals of OR gate 179. A first input terminal of AND gate 180 is coupled to the output terminal of OR gate 172, a first input terminal of AND gate 181 is coupled to the output terminal of OR gate 173 and a first input terminal of AND gate 182 is coupled to the output terminal of OR gate 174. A second terminal of AND gate 180 receives a positive logic signal when there is no Mask Signal M4, in Register RCU of FIG. 6A. A second input terminal of AND gate 181 receives a positive logic signal when there is no Mask Signal M3 in Register RCU of FIG. 6A. A second input terminal of AND gate 182 receives a positive logic signal when there is no Mask Signal M2 in Register RCU of FIG. 6A.

Operation of the Preferred Embodiment

The method of providing visibility to the various error checking units in data processing system is basically identical for the Central Processing Unit, the Input/Output Controller, a Memory Interface Unit, and the Main Memory Subsystem. All system error signal groups can be entered in either the Register RC located in the CPU or in the Register RI located in the IOC. The Register RC receives all the internal CPU error signal groups and all MIU and MMS signal groups related to operations in the CPU. The Register RI receives all the internal IOC error signals group, and all the IOC-related MIU and MMS error signal groups. The use of two registers in this fashion provides a significant reduction of the amount of additional data transfer paths required for display of information. The integrity error signal groups for the MMS are identical for the CPU or IOC and the association with one subsystem is determined by which subsystem is addressing the Main Memory.

The error signal groups for each unit is formed of 32 or less logic signals. These basic error signal groups are called Secondary signal groups. For each of the Secondary groups, a primary error signal is generated. The primary error signals are sent via direct or non-functional paths to the RC or the RI Error Collection Registers. The primary error signals along with the Message Type Signals defining the current mode of operation of the data processing unit are then delivered to a control portion of the data processing unit in order to initiate as response appropriate to the mode of operation. Each collection register contains 64 positions. The first 32 positions are used to store the primary error signals and to display various control fields required for the operation of the Error Signal collection network. The second 32 positions of the register is reserved for holding the appropriate Secondary error signal group.

In the preferred embodiment, there are two methods for moving the secondary level error signal groups to the RC or RI error signals collection registers. Error signal groups can be transmitted to the error collection registers over functional data paths. Error signal groups can be transmitted directly to the error collection register via paths reserved for this data transfer. Transfer of error signal groups, from remote portions of the apparatus such as the MIU or MMS is typically performed via function paths under control of the data processing unit. FIGS. 4 and 5 summarize the methods by which each of the secondary groups in each unit is transferred to the error collection register.

Within the Central Processing Unit, error signal groups are organized into 7 Secondary error signal groups of 32 or less signal positions. Each Secondary signal group generates the primary error signal which is placed in the Error Collection Register RC. In the preferred embodiment, all seven Secondary error groups are loaded directly by non-functional paths into the second 32 position of the RC register. The error collection registers can hold all primary error signals, but only one secondary error group at a time. Thus, in multiple error environment, a priority network is used to select which of the possible secondary error signal groups is loaded into the Error Collection Register RC.

The Input/Output Controller has 21 secondary error groups of 32 or less signal positions. Five of these secondary groups are loaded directly into the Error Collection Register RI via non-functional paths. The other sixteen secondary error signal groups are associated with Channel Control Units and are loaded into the RI register via firmware-controlled functional paths. There is a separate primary error signal for each of the five hardware-loaded secondary groups, and a common primary error signal for the sixteen Channel Control Unit secondary error signal groups. Moreover, a four position field of the first 32 positions of the Registers RI contains a signal group designating the particular Channel Control Unit related to the secondary error signal group.

The Memory Interface Unit has two secondary error groups of 32 or less signal positions. One secondary signal group contains the CPU-related error signals, while the other group contains the IOC-related error signals. Two primary error signals, generated from these secondary signal groups, are sent directly to the appropriate Error Collection Register, RI or RC. The secondary error signal groups are transferred under control of the CPU, to the appropriate Error Collection Register RC or RI, by diagnostic read of the appropriate Error Collection Register-CPU or Error Collection Register-IOC of the Memory Interface Units. The primary error signals delivered to the CPU indicate the presence of the related secondary error signal groups. The Central Processing Unit delivers the CPU-related secondary error signal group to the Register RC and the IOC-related secondary error signal group to the Register RI.

The Main Memory Subsystem has four secondary error signals groups of 32 signal positions. In the preferred embodiment, each MSR contains three thirty-two position registers. However, except for addressing the selected one of the three registers, the operation is similar to one register association with each Main Memory Module. A secondary error group is stored in the register referred to as Maintenance Status Register (MSR) for each module of the MMS. A common primary error signal for all four MMS modules is formed by monitoring control lines from the Main Memory Subsystem. Thus, the primary error signal sent to the Register RC and the Register RI, is an indication of an error somewhere within the four secondary error groups of the MMS. As in the MIU, the four MMS secondary error groups, stored in the four MSR registers, are read via functional data paths by a diagnostic read instruction issued by the Central Processing Unit.

Within the Central Processing Unit, all integrity check signals and status functions are collected on the basis of zones. (Status functions are indicators of certain machine states and modes as well as special check circuit outputs whose presence does not indicate an error.)

Referring to FIG. 3, the Central Processing Unit is divided into four zones. In Zone 1 (containing the CIA and CSU) and in Zone 4 (containing the ALU-byte and LSU), there are 32 or less error signals and status functions available. As a result, there is only one primary error signal associated with each zone. In Zone 2 (containing the ACU, IFU and DMU) and Zone 3 (containing the ALU-word), there are more than 32, but less than 96 error signals and status functions available. These two zones have multiple primary error signals.

In Zones 1 and 4, the error signal and the status functions, i.e. Error In and Status In signals are applied directly to the appropriate selection circuits and consequently to the Register RC positions. The Error In signals are collected to generate a primary error signal which is sent directly to the RC register. The output of the Selection Circuits, called Error Out and Status Out signals, are referred to as the output secondary error signal group for that zone, and are the signals delivered to Register RC.

In Zones 2 and 3, the Zone Secondary Error Selector is used to select one of two or three input secondary error signal groups to be stored in the Register RC. In Zone 2, the first two input secondary error signal groups consists of all error signals. The third input secondary error group has 23 error signals and 9 status signals. The Zone Secondary Error Selector generates all related primary error signals (one per input secondary error group) which are sent directly to the Register RC.

Because there is a possibility of having error signal groups in more than one input secondary error group at the same time, the integrity check collection and the storage system allows for the selection of a secondary error signal group to be stored in the Register RC. This is done by prioritizing the input secondary error groups through their primary error group. There are seven CPU input secondary error signal groups, four possible output secondary error signal groups (one per zone). Register RC can hold only one secondary error signal group. The system must have two levels of priority. Priority Level 1 determines the priority for the multiple input secondary error signal groups of Zones 2 and 3, while priority level 2 determines the priority of four possible Zonal secondary error signal group to be placed in the Register RC.

The input error signal groups for the multiple region Zone 2 and Zone 3 are selected (i.e. level one priority) by the circuit shown in FIG. 8. The intermediate error signal groups (Z2T or Z3T) produced for Zone 2 and Zone 3 by the circuit of FIG. 8 are applied to selection network such as are shown in FIG. 7. The single input secondary error signal groups of Zone 1 and 4 are applied directly to selector circuits of the type shown in FIG. 7 without necessity for prior processing. The selector circuits of FIG. 7 determine level two priority of the error signal groups.

In Zones 2 and 3, the Zone Secondary Error Selector 193 is designed in such a manner that the priority of the input secondary error groups is programmable. In the first 32 positions of the Register RC (i.e. RCU), there are two fields of two positions each. These fields are used to display and control the priority conditions in Zone 2 and 3 such that the relative importance of the three possible input secondary error signal groups is controlled by the fields of the Register RC. Corresponding to each secondary error signal group in Zone 2, a CPU primary error signal P2, P3, or P4, is generated. In Zone 3, a primary error signal P5 or P6 is generated in response to an error in the associated input secondary error signal group.

The first half of the Register RC also contains a third field of two bits which controls the priority of the four CPU secondary error signal groups (one per Zone) for determining the level two priority of the error signal groups. The output secondary error signal group with the highest priority is entered into the remaining 32 positions of the Register RC. By combining the capabilities of both levels of priority for the secondary error signal groups, all combinations of priorities for the seven signal input groups can be achieved.

It may be necessary to determine the status of the Status In functions in the various zones in the Central Processing Unit. If the Status In is part of a multi region zone, an appropriate code causes the primary error signal, associated with the input secondary error signal group having the Status-In signals, to be placed in Register RC. The input secondary error signal group with Status In signals is then set to the highest level 1 priority. Thus, with no error signals, this input secondary error signal group becomes the intermediate secondary error signal group for the Zone. The intermediate secondary error signal group is then applied to the selection circuit for determining the level 2 priority. The level 2 priority have similarly been set so that the one desired output secondary signal group is present. If there are error signals set in the same group, they are stored at the same time as the Status In signals. If there are Error In integrity check signals in other input Secondary error signal groups in the Zone, they are ignored because they are lower in priority. The Primary Priority field is used to determine which output secondary error signal group is delivered to the Register RC. Any time that an error occurs in the appropriate secondary group, the associated Status In field signals will be read.

The apparatus for establishing priority among the secondary error signal groups is especially valuable to diagnostic and test procedures, where a subroutine tests a specified portion of the data processing unit and fault conditions, not in the specified portion, would receive a lower priority.

The apparatus for fault condition apparatus also has the capability of masking or concealing the detection of certain errors from the data processing unit so that the normal response to detection of an error condition does not occur. For each of the seven primary error signals in the Register RC that are associated with the hardware delivered input secondary error signal group, there is a corresponding mask position. In normal operation of the data processing unit, positions are set to zero, that is to say, no errors are masked. When a fault condition is detected, the primary error signal for that input secondary error signal group is placed in the appropriate position of the register. This input secondary error signal group becomes the output secondary error signal group for that Zone. The primary error signal and the output secondary error signal group are sent to the Register RC. If the mask bit for the particular primary error signal is unmasked (i.e. is absent), the primary error signal and the output secondary error signal group are stored or latched by the selection circuits. If this mask bit position has a position value, the primary error signal alone is recirculated, and the output secondary error signal group is not to be recirculated or latched. As long as the error in error signal group remains and no higher priority error signal group occurs, the Register RC will contain the secondary error signal group.

To gain visibility to a specific input secondary error signal group, regardless of the errors existing in the other input secondary error signal groups, the primary error signal associated with the desired input secondary error signal group is given the higher priority and only the mask position for that primary is not set to 1. In this mode of operation, only the error signal group of the specified input Error-In signal Group will be stored or latched in the Register RC. All other levels will appear in the Register RC according to priority only as long as they are not replaced by the unmasked secondary error signal group.

The occurrence of one (or more) unmasked primary error signals generates a hardware interrupt in the Control Store Interface Adapter. The input secondary error signal group with the highest priority is set in a lower half of the Register RC. All primary error signals are held in the upper half of the RC Register. The attention line to the System Diagnostic Panel is raised to signal that the RC Register RC has a displayable message. The occurrence of one or more masked primary signals will set a flag which is testable from the Control Store Interface Adapter. The input secondary error signal group with the highest priority is visible in the Register RC, along with all valid primary error signals.

For certain test and diagnostic purposes error signals are to be introduced into the Error Out signals of the Selection circuits. A Force Error signal, generated by the date processing unit, or externally generated, applies positive logic signals to all of the Primary Error Signals and all the positions of the secondary error signal groups.

The apparatus is adapted to be reset into a ready condition upon the application of an Error Reset signal applied to the selection circuits and to the Error Collection Registers.

The above description is included to illustrate the operation of the preferred embodiment and is not meant to limit the scope of the claims. The scope of the invention is to be limited only by the following claims. From the above discussion, many variations will be apparent to one skilled in the art that would yet be encompassed by the spirit and scope of the invention.

What is claimed is:

1. In combination with a data processing unit, apparatus for processing signals generated in response to a fault condition in said data processing unit, comprising:

a plurality of means for detecting fault conditions occurring in said data processing unit, each of said plurality of detection means generating specified error signals upon detection of a fault condition, said plurality of detection means arranged into groups of detection means, each of said groups of detecting means coupled to a specified portion of said data processing unit, said groups of detection means producing at least one error signal group in response to a detected fault condition, said error signal group identifying said detected fault condition;

means for selecting a one of said error signal groups, said selection means being coupled to said plurality of detection means, said selection means generating a predetermined primary error signal in response to each of said error signal groups applied to said selection means; and a register coupled to said selection means for storing said selected one error signal group and each of said predetermined primary error signals.

2. The apparatus of claim 1 further including apparatus associated with said storage register for generating an interrupt signal in response to at least one of said primary signals, said interrupt signal being applied to said data processing unit, said interrupt signal causing said data processing unit to suspend operation.

3. The apparatus of claim 2 further including apparatus associated with said storage register for preventing said interrupt signal when a mask-error signal corresponding to said primary error signal is present in said register.

4. The apparatus of claim 3 wherein said error signal groups have a preestablished priority, an error signal group having a higher priority replacing a lower priority signal group in said storage register.

5. The apparatus of claim 4 wherein said plurality of detection means, said selection means and said storage register are associated with a first portion of said data processing unit, and further including a second plurality of detection means, a second selection means and a second storage register associated with a second portion of said data processing unit.

6. The apparatus of claim 5 wherein error signal groups from preselected portions of said data processing unit are applied to said selection means and said second selection means via special data paths and wherein error signal groups from remaining portions of said data processing unit are applied to said selection means via data paths used in normal data processing.

7. In combination with a data processing unit, apparatus for processing signals identifying a fault condition in said data processing unit comprising:

means for storing a selected group of error signals, said selected error signal group identifying said fault condition in said data processing unit;

means for generating said selected error signal group coupled to said storage means, said selected error signal group generated in response to at least one fault condition signal group applied to said signal generating means; and a plurality of fault condition detection circuits for determining the presence of a fault condition, said fault condition detection circuits coupled to said signal generating means, each of said fault condition circuits producing a predetermined one of said fault condition groups in response to said presence of each detected fault condition.

8. The apparatus of claim 7 wherein said signal generating means further includes means for generating a selected primary signal in said error signal group in response to application of each fault condition signal group, said selected primary signal determined by a location of said fault detection means producing said each fault detection signal group.

9. The apparatus of claim 8 further including means for signaling a presence of a primary signal in said error signal to said data processing unit in response to at least one primary signal. Said signaling means causing operation of said data processing unit to be suspended.

10. The apparatus of claim 9 further including means for preventing suspension of said data processing unit operation by said signaling means for predetermined primary error signals.

11. The apparatus of claim 10 further including apparatus for imposing a preestablished priority for each of said error signal groups, a higher priority signal group replacing a lower priority signal group in said register.

12. In combination with a data processing unit having an input/output controller, a central processing unit, a main memory unit and a memory interface unit, apparatus for processing signals identifying a fault condition in said data processing unit comprising:

a first register for storing first error signal groups associated with fault conditions occurring in the central processing unit;

a second register for storing second error signal groups associated with fault conditions occurring in the input/output controller;

a first plurality of fault condition detecting circuits for detecting errors in said central processing unit, each of said fault condition detection circuit producing a predetermined first fault condition signal group in response to detection of each fault condition in said central processing unit;

a second plurality of fault condition detecting circuits for detecting errors in said input/output controller; each of said fault condition detection circuits producing a predetermined second fault condition signal group in response to detection of each fault condition in said input/output controller;

a first selection network coupled to said first register and said plurality of first fault condition detection circuits, said first selection network producing said first error signal group in response to an application of at least one first fault condition group to said first selection network said first signal group including first primary signals identifying each of said fault detection circuits detecting a fault condition; and a second selection network coupled to said second register and said plurality of second fault condition detection networks, said second selection network producing said second error signal group in response to an application of at least one second fault condition signal group to said second selection network, said second signal group including second primary signals identifying each of said fault detection networks detecting fault condition.

13. The apparatus of claim 12 further including:

a first memory interface unit apparatus for storing fault condition signal groups for fault conditions detected in a portion of said memory interface unit associated with the said central processing unit, said detection of a fault condition causing a preselected first MIU error signal group, said first MIU error signal group applied to said first storage register in response to a first control signal; and a second memory interface unit apparatus for storing a fault condition signal group in response to fault conditions detected in a portion of said memory interface unit associated with said input/output controller, said detection of a fault condition causing a preselected second MIU error signal group, said second MIU error signal group applied to said first storage register in response to a second control signal.

14. The apparatus of claim 11 further including first MSR apparatus associated with said main memory for storing fault condition signal groups generated in response to detection of a fault condition in a portion of said main memory unit associated with said central processing unit, said first apparatus associated with said main memory unit applying a predetermined MMS error signal group in said first register, said MMS error signal group applied to said first storage register in response to a third control signal; and second MSR apparatus associated with said main memory for storing fault condition signal groups generated in response to detection of a fault condition in a portion of said main memory unit associated with said input/output controller, said second apparatus associated with said main memory unit applying a predetermined second error signal group in said first register, said second error signal group applied to said first storage register in response to a fourth control signal.

15. The apparatus of claim 14 further including apparatus supplying a interrupt signal to said data processing unit in the presence of at least one of said first and said second primary signals in said error signal group of said first and said second storage register, said interrupt signal suspending operation of said data processing unit.

16. The apparatus of claim 15, further including apparatus for preventing preselected primary signals from suspending operation of said data processing unit.

17. The apparatus of claim 16 further including first and second priority circuits establishing a preselected priority for said error signal groups, an error signal group of a highest priority associated with said central processing unit stored in said first register by said first priority circuit, and an error signal group of a highest priority associated with said input/output controller stored in said second storage register by said second priority circuit.

18. In combination with a data processing unit, a method of processing signals identifying a detected fault condition comprising the steps of:

a. dividing said data processing unit into a plurality of regions;

b. detecting a fault condition occurring in each of said regions with fault condition detection apparatus associated with said regions;

c. generating a fault condition signal group identifying each detected fault condition;

d. selecting a fault condition signal group by means of a priority apparatus;

e. storing said selected fault condition signal group in a storage means;

f. generating a preselected primary signal identifying for each of said plurality of regions in which a fault condition is detected; and g. storing each of said preselected primary signal along with said fault condition signal group.

19. The method of claim 18 further including the step of:

h. suspending operation of said data processing unit in response to a generation of a primary signal.

20. The method of claim 19 further including the step of:

i. inhibiting said suspension of operation of said data processing unit for a given primary signal in response to a preselected mask signal related to said given primary signal.

21. In combination with a data processing unit, a method of processing fault condition information comprising the steps of:

a. detecting a fault condition in a data processing unit having a plurality of fault detection networks;

b. generating a fault condition error signal group identifying said detected fault condition;

c. selecting a fault condition error signal group when more than one fault condition error group is present;

d. storing said selected fault condition error signal group in a storage register;

e. generating a preselected primary error signal for each fault detection network detecting an error; and f. storing said primary error signals in said storage register.

22. The method of claim 21 further including:

g. selecting primary error signals and fault condition signal groups associated with the central processing unit for storing in a first register; and h. selecting primary error signals and fault condition signal groups associated with an input/output controller for storage in a second register.

23. The method of claim 22 further including:

i. suspending operation of said data processing unit in the presence of a primary error signal.

24. The method of claim 23 further including:

j. continuing operation of said data processing unit in the presence of a primary error signal, when preselected mask signal associated with said primary error signal is present.

25. The method of claim 24 further including:

k. establishing a priority for each of said fault condition error signals groups; and l. storing a highest priority fault condition error signal group associated with said central processing unit in said first register and storing a high priority fault condition error signal group associated in said input/output controller in said second storage register.

* * * * *